US007046662B1

(12) United States Patent
Saluja et al.

(10) Patent No.: US 7,046,662 B1
(45) Date of Patent: May 16, 2006

(54) SYSTEM, DEVICE, AND METHOD FOR DISTRIBUTING ROUTING INFORMATION IN AN OPTICAL VIRTUAL PRIVATE NETWORK

(75) Inventors: Rajesh Saluja, Billerica, MA (US); Stephen Suryaputra, Malden, MA (US); Vikram Ramachandran, Tyngsboro, MA (US); Indermohan S. Monga, Lexington, MA (US); Shobhan M. Lakkapragada, Tyngsboro, MA (US); Khera Gautam, Chelmsford, MA (US)

(73) Assignee: Nortel Networks Ltd (CA)

( * ) Notice: Subject to any disclaimer, the term of this patent is extended or adjusted under 35 U.S.C. 154(b) by 886 days.

(21) Appl. No.: 09/934,446

(22) Filed: Aug. 21, 2001

(51) Int. Cl.
*H04L 12/28* (2006.01)

(52) U.S. Cl. .................. 370/389; 370/395.53; 370/400

(58) Field of Classification Search ................ 370/254, 370/255, 256, 351, 389, 392, 252, 400, 401, 370/409, 395.31, 395.53; 398/43, 51
See application file for complete search history.

(56) References Cited

U.S. PATENT DOCUMENTS

| 5,774,669 | A | 6/1998 | George et al. | |
|---|---|---|---|---|
| 5,903,370 | A | 5/1999 | Johnson | |
| 5,905,715 | A | 5/1999 | Azarmi et al. | |
| 6,636,895 | B1 * | 10/2003 | Li et al. | 709/238 |
| 6,850,515 | B1 * | 2/2005 | Chang et al. | 370/352 |

OTHER PUBLICATIONS

The ATM Forum Technical Committee, PNNI Augmented Routing (PAR) Version 1.0, AF-RA-0104.000, Jan., 1999.
Optical Domain Service Interconnect (ODSI) Functional Specification, ODSI Coalition, Aug. 2000, Version 1.4, Bernstein, et al.
Routing Information Exchange in Optical Networks, Internet Draft, Expiration Date: May 24, 2001, Pendarakis et al.
MPLS-based Layer 2 VPNs, Network Working Group Internet Draft, Expiration Date: May 2001, Kompella et al.
BGP/MPLS VPNs, Network Working Group Request for Comments: 2547, Rosen et al., Mar., 1999.
Virtual Private Networks, Making the Right Connection, Dennis Fowler, Copyright 1999 by Morgan Kaufmann Publishers, Inc.
A Guide to Virtual Private Networks, Murhammer et al., Prentice Hall PTR, Copyright International Business Machines Corporation 1998.

\* cited by examiner

*Primary Examiner*—Chi Pham
*Assistant Examiner*—Alecander O. Boakye
(74) *Attorney, Agent, or Firm*—McGuinness & Manaras LLP (57) ABSTRACT

A system, device, and method for distributing routing information in an optical virtual private network establishes an initial bootstrap topology and distributes the routing information over the initial bootstrap topology. Each node establishes a communication connection to one and only one lower priority peer node if such a lower priority peer node exists. If more than one lower priority peer nodes exist, then one of the lower priority peer nodes is selected and the communication connection is established to the selected lower priority peer node.

28 Claims, 6 Drawing Sheets

SYSTEM, DEVICE, AND METHOD FOR DISTRIBUTING ROUTING INFORMATION IN AN OPTICAL VIRTUAL PRIVATE NETWORK

CROSS-REFERENCE TO RELATED APPLICATION(S)

The present application may be related to the following commonly owned United States patent applications, which are hereby incorporated herein by reference in their entireties:

U.S. patent application Ser. No. 09/930,126 entitled SYSTEM AND DEVICE FOR PROVIDING COMMUNICATION SERVICES IN AN OPTICAL COMMUNICATION SYSTEM, filed on Aug. 15, 2001 in the names of Bruce A. Schofield, Indermohan S. Monga, and Stephen Suryaputra; and U.S. patent application Ser. No. 09/930,119 entitled SYSTEM, DEVICE, AND METHOD FOR MANAGING COMMUNICATION SERVICES IN AN OPTICAL COMMUNICATION SYSTEM, filed on Aug. 15, 2001 in the names of Bruce A. Schofield, William R. Hawe, Paul D. Callahan, Indermohan S. Monga, Stephen Suryaputra, and Andre N. Fredette

FIELD OF THE INVENTION

The present invention relates generally to optical networking, and more particularly to distributing routing information in an optical virtual private network.

REFERENCES

The following references are hereby incorporated herein by reference in their entireties, and are referred to hereinafter according to the reference numbers in brackets:

[1] The ATM Forum Technical Committee, *PNNI Augmented Routing(PAR) Version 1.0*, AF-RA-0104.000.
[2] G. Bernstein et. al., *Optical Domain Service Interconnection(ODSI) Functional Specification version 1.3*, ODSI Coalition.
[3] D. Fowler, *Virtual Private Networks*, Morgan Kaufmann Publishers, 1999.
[4] D. Pendarakis, B. Rajagopalan and D. Saha, *Routing Information Exchange in Optical Networks*, Internet Draft, draft-prs-optical-routing-01.txt.
[5] K. Kompella et. al., *MPLS-based Layer 2 VPNs*, Internet Draft, draft-kompella-mpls-l2vpn-02.txt.
[8] M. W. Murhammer et. al., *A Guide to Virtual Private Networks*, Prentice Hall PTR, New Jersey, 1998.
[9] E. Rosen and Y. Rekhter, *BGP/MPLS VPNs*, IETF RFC 2547, May 1999.

BACKGROUND OF THE INVENTION

A virtual private network (VPN) is commonly defined as an overlay network that is built over a public network infrastructure that provides the VPN user (client) a secure, private connection using tunneling, encryption, and authentication [3][8]. When built over an optical network, a VPN is commonly referred to as an optical VPN (O-VPN).

VPNs can be built at layer 2 (L2) of the network, for example using technologies like X.25, Frame Relay, or ATM [5], or at layer 3 (L3) of the network, for example, over the Public Internet using the Internet Protocol (IP) [9]. For convenience, VPNs built at layer 2 of the network are often referred to as L2 VPNs, while VPNs built at layer 3 of the network using IP are often referred to as L3 VPNs or IP VPNs.

L2 VPNs can be client-managed or carrier-managed [7].

In a client-managed VPN, the VPN service provider only provides L2 point-to-point connectivity to the VPN user/client, and the VPN user/client is responsible for L3 connectivity (i.e., routing). Therefore, the user/client is still responsible for designing its L3 topologies on top of the L2 connections.

Another aspect of an L2 VPN is the concept of a closed-user group (CUG) in which a particular site is only "visible" to other sites that belong to the same VPN. For example, in a Frame Relay VPN, a non-member site cannot connect to a member site even if the non-member site knows the DLCI (address) of the member site.

The design of an L3 VPN is generally more complex than that of an L2 VPN. There are three commonly-used interconnections for L3 topologies, namely a full-mesh interconnection, a "hub and spoke" interconnection, and a partial mesh interconnection. The full-mesh interconnection does not scale well because it generally requires on the order of $O(N^2)$ L2 point-to-point connections for N L3 devices, and each L3 device generally needs to maintain (N−1) routing adjacencies. The "hub and spoke" interconnection eliminates these problems, although the resulting traffic concentration at the hub can lead to bottlenecks and a single point of failure. The partial mesh interconnection eliminates many of the problems of both the full-mesh interconnection and the "hub and spoke interconnection," but requires careful and sophisticated network engineering.

In a carrier-managed VPN, the VPN service provider distributes user/client L3 routes on behalf of the user/client. One proposal for distributing user/client L3 routes uses BGP to distribute the routes and uses MPLS for the circuits [9]. Some disadvantages of this proposal are that the edge devices of the service provider's network need to run both EBGP and IBGP, and the user/client needs to trust the service provider with its address information.

It should be noted that, in both a client-managed VPN and a carrier-managed VPN, the service provider must ensure that there is a partition between the user/client routes and the service provider's routes and also between the user/client routes for different VPNs.

Distributing user/client routes using a shared infrastructure has been implemented in ATM using PNNI Augmented Routing (PAR) [1]. PAR uses IPv4 Service Definition Information Group (IG) to carry IPv4 routes inside a PTSE (PNNI Topology State Element), which is similar to a Link State Advertisement in OSPF. Those PTSEs are then flooded to the whole PNNI network. Eventually, the PTSEs will reach to the edge of the PNNI network, where a PAR-capable client interprets such IP-related information. The PAR-capable client is also responsible for generating such PTSEs. One drawback of PAR is that it does not scale well to an optical network having a large number of VPN users/clients.

Routing information exchange over an optical network has been discussed in the VPON (Virtual Private Optical Network) Internet draft [4]. This draft discusses a number of models to perform the exchange over a user-to-network interface channel. One model is a full peer routing model for a flat routing organization in which the optical network and the user/client VPN network run a single instance of a routing protocol (e.g., a single OSPF instance). This model is not suitable for an optical network that is based upon an overlay model for building VPNs. Another model is a full peer routing model for domain specific routing in which each VPN user/client runs its own routing instance (e.g., OSPF, or BGP as in [9]). Another model is a partial peer routing model in which only the optical network only advertises the point of attachment of VPN client devices. Those attachment addresses are then used to connect VPN client devices in a linear (bootstrap) topology that is used just for exchanging routes, and may be changed dynamically after the routes have been exchanged based upon traffic engineering. VPON does not discuss a particular algorithm or method for constructing this initial bootstrap topology.

SUMMARY OF THE INVENTION

In accordance with one aspect of the present invention, routing information is distributed in an optical virtual private network by establishing an initial bootstrap topology and distributing the routing information over the initial bootstrap topology.

In accordance with another aspect of the present invention, the initial bootstrap topology is established by having each node establish a communication connection to one and only one lower priority peer node, if such a lower priority peer node exists. If more than one lower priority peer nodes exist, then one of the lower priority peer nodes is selected according to a predetermined selection scheme, and the communication connection is established to the selected lower priority peer node.

In accordance with another aspect of the present invention, the predetermined selection scheme is based upon a "cost" to each lower priority peer node. The "cost" may be based upon hop count information, link state information, or the actual cost of a communication connection, to name but a few. The node preferably selects the lower priority peer node having the lowest cost.

DETAILED DESCRIPTION OF A PREFERRED EMBODIMENT

Described herein is a technique for constructing an initial bootstrap topology for distributing O-VPN user/client routing information to a number of nodes in an optical communication network. In an embodiment of the present invention, each node identifies the other (peer) nodes using a predetermined peer discovery scheme and determines a relative priority for each node according to a predetermined priority scheme. Each node establishes a communication connection to one and only one lower priority peer node, if such a lower priority peer node exists. If more than one lower priority peer node exists, then the node selects one of the lower priority peer nodes according to a predetermined selection scheme and establishes the communication connection to the selected lower priority peer node. Thus, the lowest priority node does not establish a communication connection to another peer node, the second lowest priority node establishes a communication connection to the lowest priority node, the third lowest priority node establishes a communication connection to either the lowest priority node or the second lowest priority node, and so forth.

Figure 1:
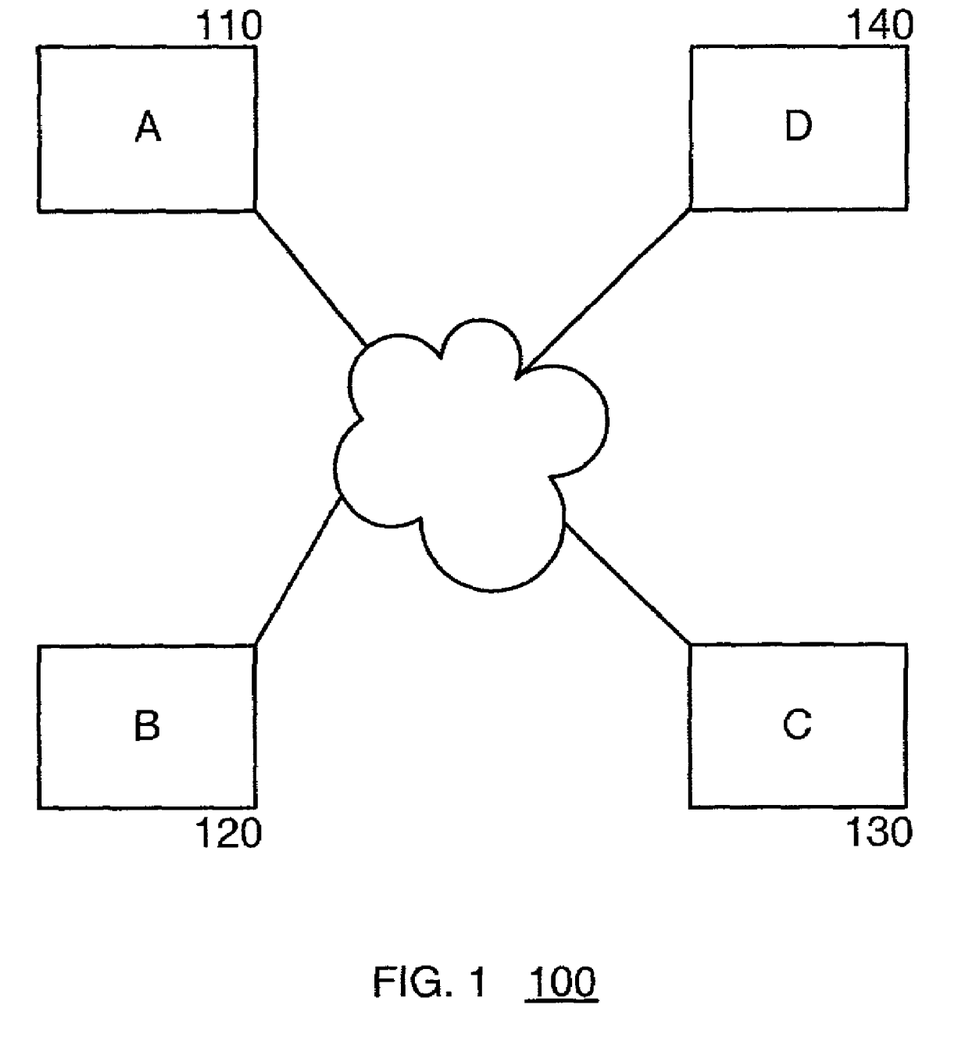
FIG. 1 is a communication system diagram showing an exemplary communication network having four nodes in accordance with an embodiment of the present invention.

FIG. 1 shows an exemplary optical communication network 100 having four nodes 110 (A), 120 (B), 130 (C), and 140 (D). For convenience, the letters A–D represent the relative priorities of the nodes, such that node 110 (A) is the highest priority node and node 140 (D) is the lowest priority node.

In order to establish an initial bootstrap topology for distributing O-VPN user/client L3 routing information, each node identifies its peer nodes using a predetermined peer discovery scheme. The predetermined peer discovery scheme may involve any of a variety of techniques for identifying peer nodes. For example, each node can identify its peer nodes through pre-configured topology information or through topology information gathered dynamically. The present invention is in no way limited by the way in which a node identifies its peer nodes or to any particular peer discovery scheme.

After identifying its peer nodes, each node determines the relative priorities of all nodes according to a predetermined priority scheme. The predetermined priority scheme may involve any of a variety of techniques for prioritizing the nodes. In a typical embodiment of the present invention, the nodes are IP routers, and the relative priorities of the nodes are determined by the IP addresses of the nodes, with the lowest IP address preferably representing the highest priority node. Thus, in the example shown and described with reference to FIG. 1, the letters A–D represent the IP addresses of the nodes 110–140, respectively, with node 110 (A) having the lowest IP address and node 140 (D) having the highest IP address. The present invention is in no way limited by the way in which the nodes are prioritized or to any particular priority scheme.

Once a node has identified its peer nodes and determined the relative priorities for all nodes, the node establishes a communication connection to one and only one lower priority peer node, if such a lower priority peer node exists. If more than one lower priority peer node exists, then the node selects one of the lower priority peer nodes according to a predetermined selection scheme and establishes the communication connection to the selected lower priority peer node. Thus, in the example shown and described with reference to FIG. 1, the node 140 (D), which is the lowest priority node, does not establish a communication connection to another peer node. The node 130 (C), which is the second lowest priority node, establishes a communication connection to node 140 (D), since node 140 (D) is the only lower priority node than node 130 (C). The node 120 (B) establishes a communication connection to either node 130 (C) or node 140 (D), since both node 130 (C) and node 140 is (D) are lower priority than node 120 (B). The node 110 (A), which is the highest priority node, establishes a communication connection to either node 120 (B), node 130 (C), or node 140 (D), since node 120 (B), node 130 (C), and node 140 (D) are lower priority than node 110 (A).

Figure 2:
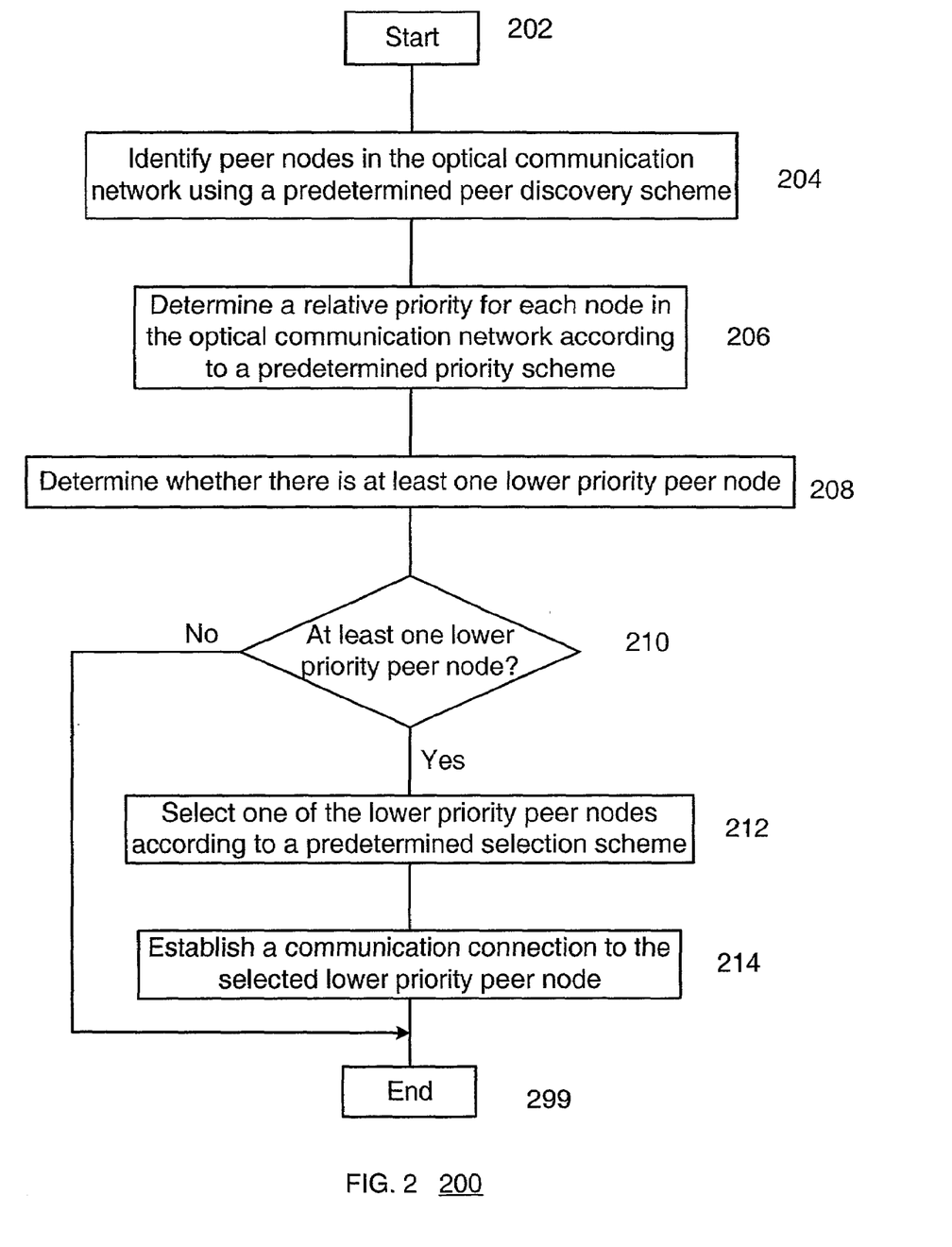
FIG. 2 is a logic flow diagram showing exemplary logic for establishing an initial bootstrap topology by a node in an optical communication network in accordance with an embodiment of the present invention.

FIG. 2 is a logic flow diagram showing exemplary logic 200 for establishing an initial bootstrap topology by a node in an optical communication network. Beginning at block 202, the logic identifies peer nodes in the optical communication network using a predetermined peer discovery scheme, in block 204. The logic determines a relative priority for each node in the optical communication network according to a predetermined priority scheme, in block 206. The logic determines whether there is at least one lower priority peer node, in block 208. If there is no lower priority peer node (NO in block 210), then the logic does not establish a communication connection to another peer node. If there is at least one lower priority peer node (YES in block 210), then the logic selects one of the lower priority peer nodes according to a predetermined selection scheme, in block 212, and establishes a communication connection to the selected lower priority peer node, in block 214. The logic 200 terminates in block 299.

The predetermined selection scheme may involve any of a variety of techniques for selecting a lower priority peer node from among a plurality of lower priority peer nodes. The lower priority peer node may be selected randomly or according to some predetermined selection criterion. The present invention is in no way limited by the way in which the lower priority peer node is selected or to any particular selection scheme.

In a typical embodiment of the present invention, the predetermined selection scheme is based upon a "cost" from the node to each lower priority peer node according to a predetermined cost scheme. The predetermined cost scheme may involve any of a variety of techniques for determining the "cost" to a particular peer node. For example, a node can determine the "cost" to a particular peer node based upon hop count (distance-vector) information, link state information, or the actual cost to establish a connection to the peer node, to name but a few. The node typically selects the lower priority peer node having the lowest "cost" according to the predetermined cost scheme and establishes the communication connection to the selected peer node. The present invention is in no way limited by the way in which the cost is determined or to any particular cost scheme.

Figure 3:
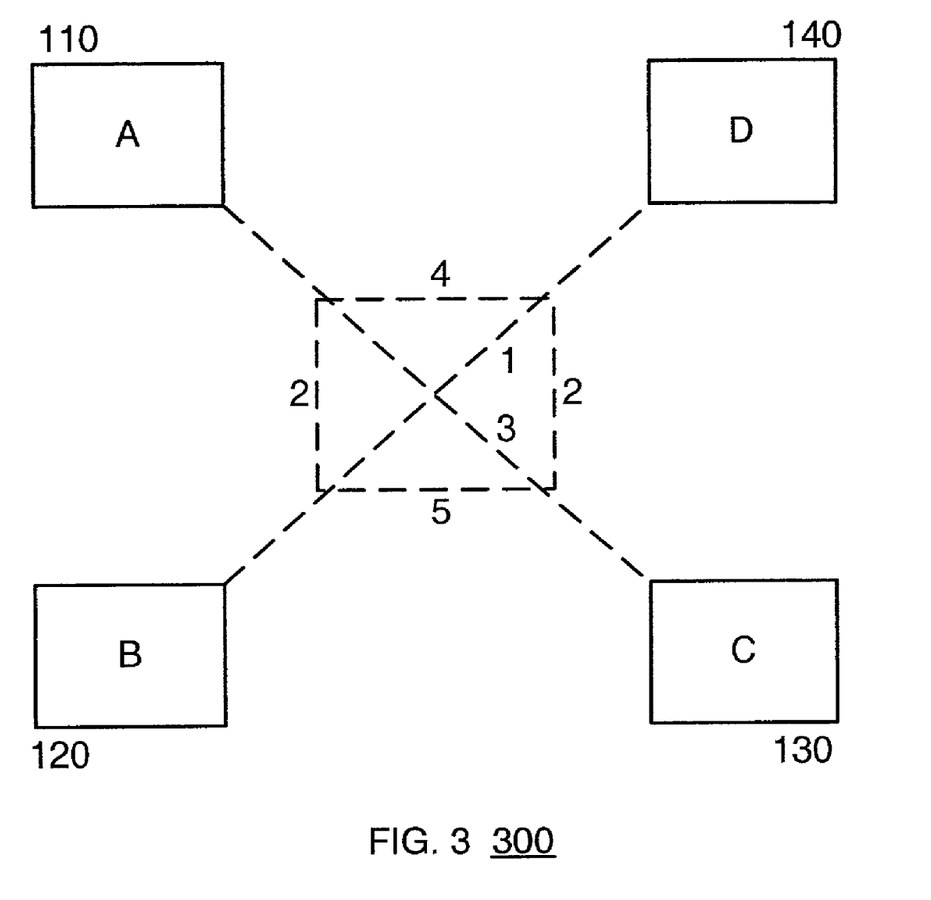
FIG. 3 is a communication system diagram showing the "cost" associated with each inter-node path in an exemplary optical communication network having four nodes in accordance with an embodiment of the present invention.

FIG. 3 shows the "cost" associated with each inter-node path in an exemplary optical communication network 300 having four nodes 110 (A), 120 (B), 130 (C), and 140 (D) as in FIG. 1. For purposes of this discussion, it is assumed that the paths are bi-directional and therefore that the cost between two nodes is the same in both directions. The following table summarizes the "cost" from each node to its lower priority peer nodes:

|        | To A | To B | To C | To D |
|--------|------|------|------|------|
| From A |      | 2    | 3    | 4    |
| From B |      |      | 5    | 1    |
| From C |      |      |      | 2    |
| From D |      |      |      |      |

Figure 4:
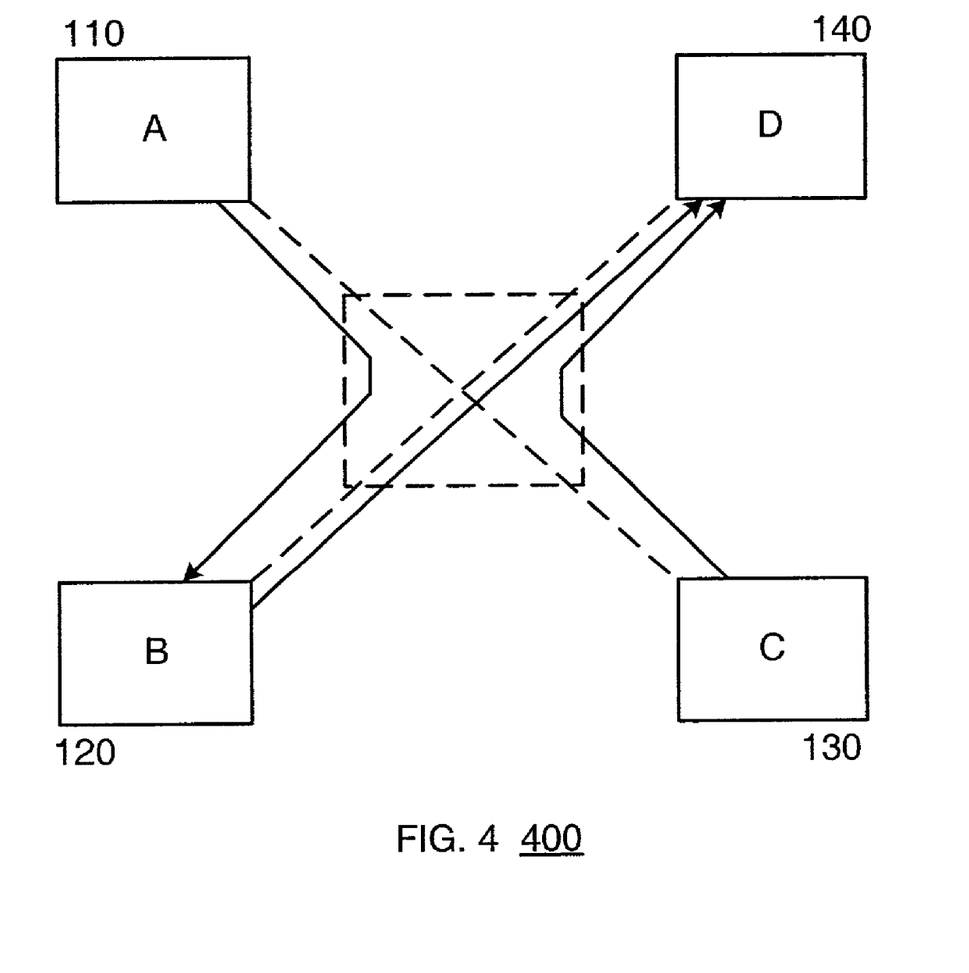
FIG. 4 is a communication system diagram showing the initial bootstrap topology established in an exemplary optical communication network having four nodes in accordance with an embodiment of the present invention.

In an exemplary embodiment of the present invention, each node preferably establishes a communication connection to the lower priority peer node having the lowest cost. Thus, as shown by the dashed lines in FIG. 4, node 110 (A) preferably establishes a communication connection to node 120 (B), node 120 (B) preferably establishes a communication connection to node 140 (D), and node 130 (C) preferably establishes a communication connection to node 140 (D). The resulting initial bootstrap topology 400 connects all nodes with the least amount of total cost. For convenience, this technique of establishing a communication connection to the lower priority peer node having the lowest cost is referred to as a least cost prioritized segment (LCPS) technique.

Figure 5:
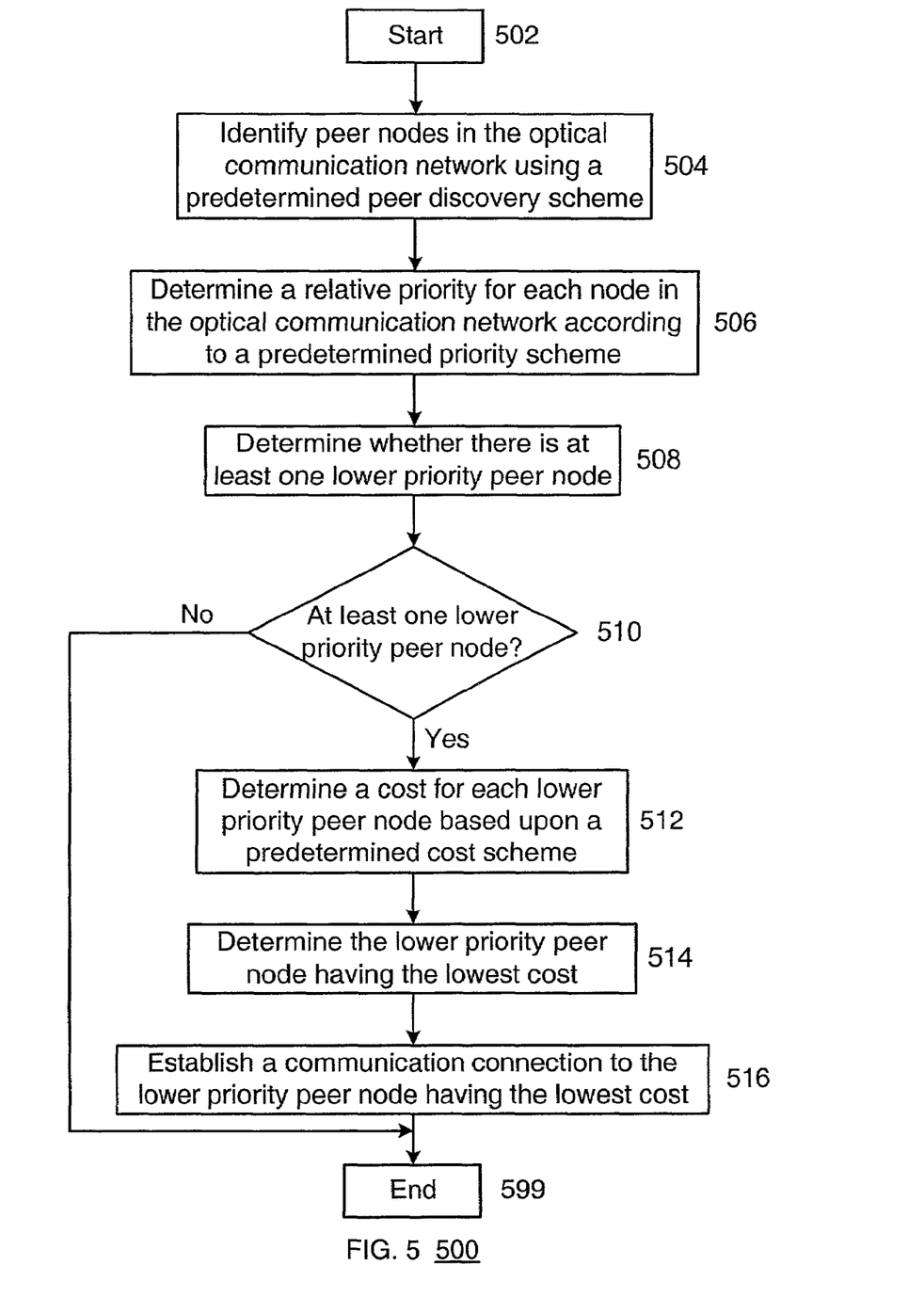
FIG. 5 is a logic flow diagram showing exemplary logic for establishing an initial bootstrap topology by a node in an optical communication network using a least cost prioritized segment technique in accordance with an embodiment of the present invention.

FIG. 5 is a logic flow diagram showing exemplary logic 500 for establishing an initial bootstrap topology by a node in an optical communication network using a LCPS technique. Beginning at block 502, the logic identifies peer nodes in the optical communication network using a predetermined peer discovery scheme, in block 504. The logic determines a relative priority for each node in the optical communication network according to a predetermined priority scheme, in block 506. The logic determines whether there is at least one lower priority peer node, in block 508. If there is no lower priority peer node (NO in block 510), then the logic does not establish a communication connection to another peer node. If there is at least one lower priority peer node (YES in block 510), then the logic determines a cost for each lower priority peer node based upon a predetermined cost scheme, in block 512. The logic determines the lower priority peer node having the lowest cost, in block 514. The logic establishes a communication connection to the lower priority peer node having the lowest cost, in block 516. The logic 500 terminates in block 599.

In any case, once the initial bootstrap topology is established, the nodes exchange routing information over the initial bootstrap topology. Thereafter, the communication connections associated with the initial bootstrap topology can be terminated or modified.

Figure 6:
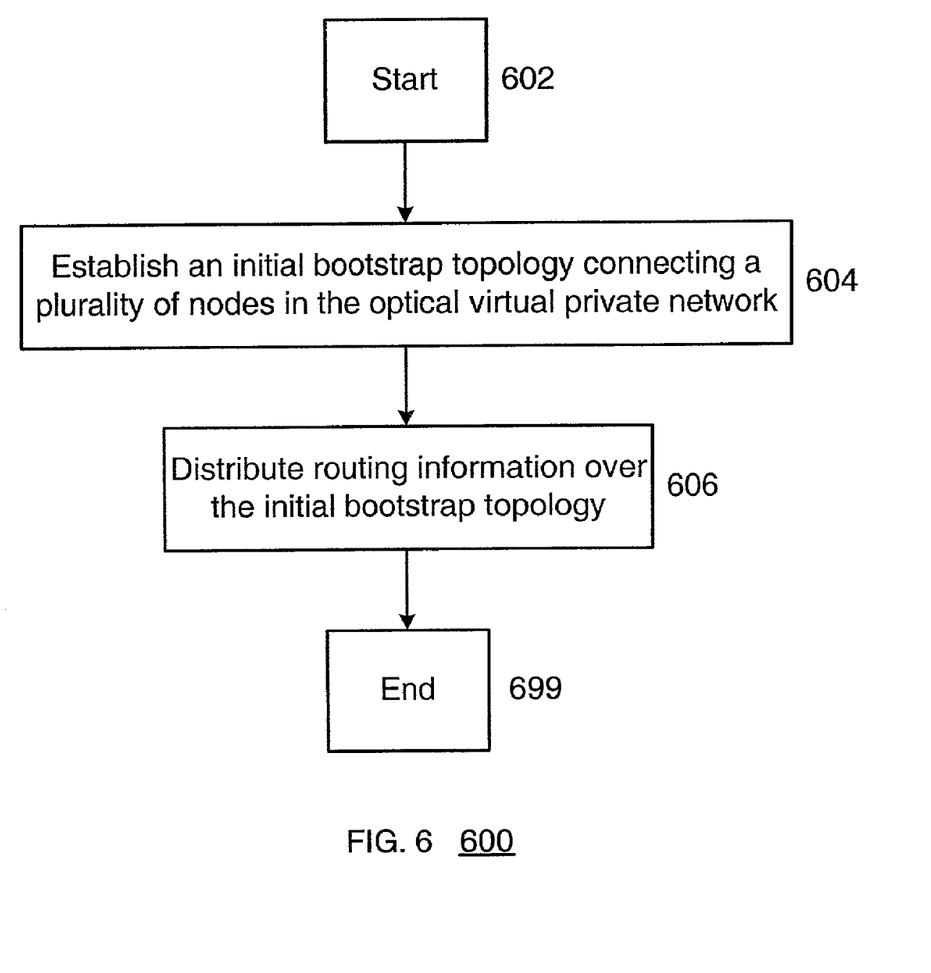
FIG. 6 is a logic flow diagram showing exemplary logic for distributing routing information in accordance with an embodiment of the present invention.

FIG. 6 is a logic flow diagram showing exemplary logic 600 for distributing routing information by a node in an O-VPN. Beginning at block 602, the logic establishes an initial bootstrap topology connecting a plurality of nodes in the O-VPN, in block 604. The logic distributes the routing information over the initial bootstrap topology, in block 606. The logic 600 terminates in block 699.

In an exemplary embodiment of the present invention, the optical communication network 150 is an automatically switched optical/transport network (ASON) as described in the related application entitled SYSTEM AND DEVICE FOR PROVIDING COMMUNICATION SERVICES IN AN OPTICAL COMMUNICATION SYSTEM, which was incorporated by reference above. Each client node typically includes an optical service agent (OSA) as described in the related application entitled SYSTEM, DEVICE, AND METHOD FOR MANAGING COMMUNICATION SERVICES IN AN OPTICAL COMMUNICATION SYSTEM, which was incorporated by reference above. The OSA typically includes, among other things, an authenticated auto-discovery mechanism for identifying peer client nodes as well as a mechanism for querying the ASON for lightpath costs. By virtue of the OSA, then, a node can identify its peer nodes in the O-VPN using the authenticated auto-discovery mechanism and/or query the ASON to determine the lightpath cost to each lower priority peer node. The node can use the information obtained via the OSA to establish the initial bootstrap topology, and, moreover, logic for establishing the initial bootstrap topology and distributing routing information over the initial bootstrap topology can be integrated into the OSA so that establishment of the initial bootstrap topology and distribution of the routing information over the bootstrap topology can be transparent to other client applications.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the logic for establishing an initial bootstrap topology for distributing L3 routing information is implemented as a set of computer program instructions that is converted into a computer executable form, stored as such in a computer readable medium, and executed by a microprocessor within the node under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for distributing routing information in an optical virtual private network, the method comprising:
    establishing an initial bootstrap topology connecting a plurality of nodes in the optical virtual private network, including the steps of:
        determining a relative priority for each of the plurality of nodes in the optical virtual private network; and
        establishing, for each node having at least one lower priority peer node, a communication connection from the node to one and only one lower priority peer node; and
    distributing the routing information over the initial bootstrap topology.

2. The method of claim 1, wherein determining a relative priority for each of a plurality of nodes in the optical private network comprises:
   determining an IP address for each of the plurality of nodes in the optical virtual private network; and
   determining the relative priority for each of the plurality of nodes based upon the IP address.

3. The method of claim 2, wherein the relative priority for each of the plurality of nodes is inversely related to the IP address such that the lowest IP address represents the highest priority and the highest IP address represents the lowest priority.

4. The method of claim 1, wherein establishing a communication connection from the node to one and only one lower priority peer node comprises:
   selecting a lower priority peer node from among the at least one lower priority peer nodes; and
   establishing the communication connection to the selected lower priority peer node.

5. The method of claim 4, wherein selecting a lower priority peer node from among the at least one lower priority peer nodes comprises:
   determining a cost for each of the at least one lower priority peer nodes; and
   selecting from among the at least one lower priority peer nodes the lower priority peer node having the lowest cost.

6. The method of claim 5, wherein determining a cost for each of the at least one lower priority peer nodes comprises one of:
   determining the cost for each of the at least one lower priority peer nodes based upon hop count information;
   determining the cost for each of the at least one lower priority peer nodes based upon link state information; and
   determining the cost for each of the at least one lower priority peer nodes based upon actual costs for establishing communication connections to each of the at least one lower priority peer nodes.

7. A device for distributing routing information in an optical virtual private network, the device representing one of a plurality of nodes in the optical virtual private network, the device comprising:
   peer discovery logic operably coupled to identify a number of peer nodes in the optical virtual private network;
   prioritization logic operably coupled to determine a relative priority for each of the plurality of nodes in the optical virtual private network; and
   connection establishment logic operably coupled to establish a communication connection to one and only one lower priority peer node provided a lower priority peer node exists.

8. The device of claim 7, wherein the peer discovery logic comprises:
   authenticated auto-discovery logic for automatically discovering and authenticating the peer nodes.

9. The device of claim 7, wherein the prioritization logic comprises:
   logic for determining an IP address for each of the plurality of nodes in the optical virtual private network; and
   logic for determining the relative priority for each of the plurality of nodes based upon the IP address.

10. The device of claim 9, wherein the relative priority for each of the plurality of nodes is inversely related to the IP address such that the lowest IP address represents the highest priority and the highest IP address represents the lowest priority.

11. The device of claim 7, wherein the connection establishment logic comprises:
   logic for selecting a lower priority peer node from among the at least one lower priority peer nodes; and
   logic for establishing the communication connection to the selected lower priority peer node.

12. The device of claim 11, wherein the logic for selecting a lower priority peer node from among the at least one lower priority peer nodes comprises:
   logic for determining a cost for each of the at least one lower priority peer nodes; and
   logic for selecting from among the at least one lower priority peer nodes the lower priority peer node having the lowest cost.

13. The device of claim 12, wherein the logic for determining a cost for each of the at least one lower priority peer nodes comprises one of:
   logic for determining the cost for each of the at least one lower priority peer nodes based upon hop count information;
   logic for determining the cost for each of the at least one lower priority peer nodes based upon link state information; and
   logic for determining the cost for each of the at least one lower priority peer nodes based upon actual costs for establishing communication connections to each of the at least one lower priority peer nodes.

14. A communication system comprising:
   a plurality of nodes interconnected over an optical communication network to form an optical virtual private network, wherein the plurality of nodes establish an initial bootstrap topology and distribute routing information over the initial bootstrap topology, and wherein each node determines a relative priority for each of the plurality of nodes and establishes a communication connection to one and only one lower priority peer node if such a lower priority peer node exists.

15. The communication system of claim 14, wherein the relative priority for each of the plurality of nodes is based upon an IP address for each of the plurality of nodes.

16. The communication system of claim 15, wherein the relative priority for each of the plurality of nodes is inversely related to the IP address such that the lowest IP address represents the highest priority and the highest IP address represents the lowest priority.

17. The communication system of claim 14, wherein each node selects a lower priority peer node from among the at least one lower priority peer nodes and establishes the communication connection to the selected lower priority peer node.

18. The communication system of claim 17, wherein each of the at least one lower priority peer nodes is associated with a cost, and wherein each node selects the lower priority peer node having the lowest cost.

19. The communication system of claim 18, wherein the cost is determined according to one of:
   hop count information;
   link state information; and
   actual cost for establishing a communication connection.

20. A computer program for distributing routing information by a node in an optical virtual private network, the computer program comprising:
   peer discovery logic programmed to identify a number of peer nodes in the optical virtual private network;

prioritization logic programmed to determine a relative priority for each of the plurality of nodes in the optical virtual private network; and connection establishment logic programmed to establish a communication connection to one and only one lower priority peer node provided a lower priority peer node exists.

21. The computer program of claim 20, wherein the peer discovery logic comprises:

authenticated auto-discovery logic for automatically discovering and authenticating the number of peer nodes.

22. The computer program of claim 20, wherein the prioritization logic comprises:

logic for determining an IP address for each of the plurality of nodes in the optical virtual private network; and logic for determining the relative priority for each of the plurality of nodes based upon the IP address.

23. The computer program of claim 22, wherein the relative priority for each of the plurality of nodes is inversely related to the IP address such that the lowest IP address represents the highest priority and the highest IP address represents the lowest priority.

24. The computer program of claim 20, wherein the connection establishment logic comprises:

logic for selecting a lower priority peer node from among the at least one lower priority peer nodes; and logic for establishing the communication connection to the selected lower priority peer node.

25. The computer program of claim 24, wherein the logic for selecting a lower priority peer node from among the at least one lower priority peer nodes comprises:

logic for determining a cost for each of the at least one lower priority peer nodes; and logic for selecting from among the at least one lower priority peer nodes the lower priority peer node having the lowest cost.

26. The computer program of claim 25, wherein the logic for determining a cost for each of the at least one lower priority peer nodes comprises one of:

logic for determining the cost for each of the at least one lower priority peer nodes based upon hop count information;

logic for determining the cost for each of the at least one lower priority peer nodes based upon link state information; and logic for determining the cost for each of the at least one lower priority peer nodes based upon actual costs for establishing communication connections to each of the at least one lower priority peer nodes.

27. The computer program of claim 20 embodied in a computer readable medium.

28. The computer program of claim 20 embodied in a data signal for conveyance over a communication medium.

* * * * *